March 28, 1961
F. J. NOWICKE
2,977,459
ELECTRODE HOLDER
Filed Jan. 14, 1959
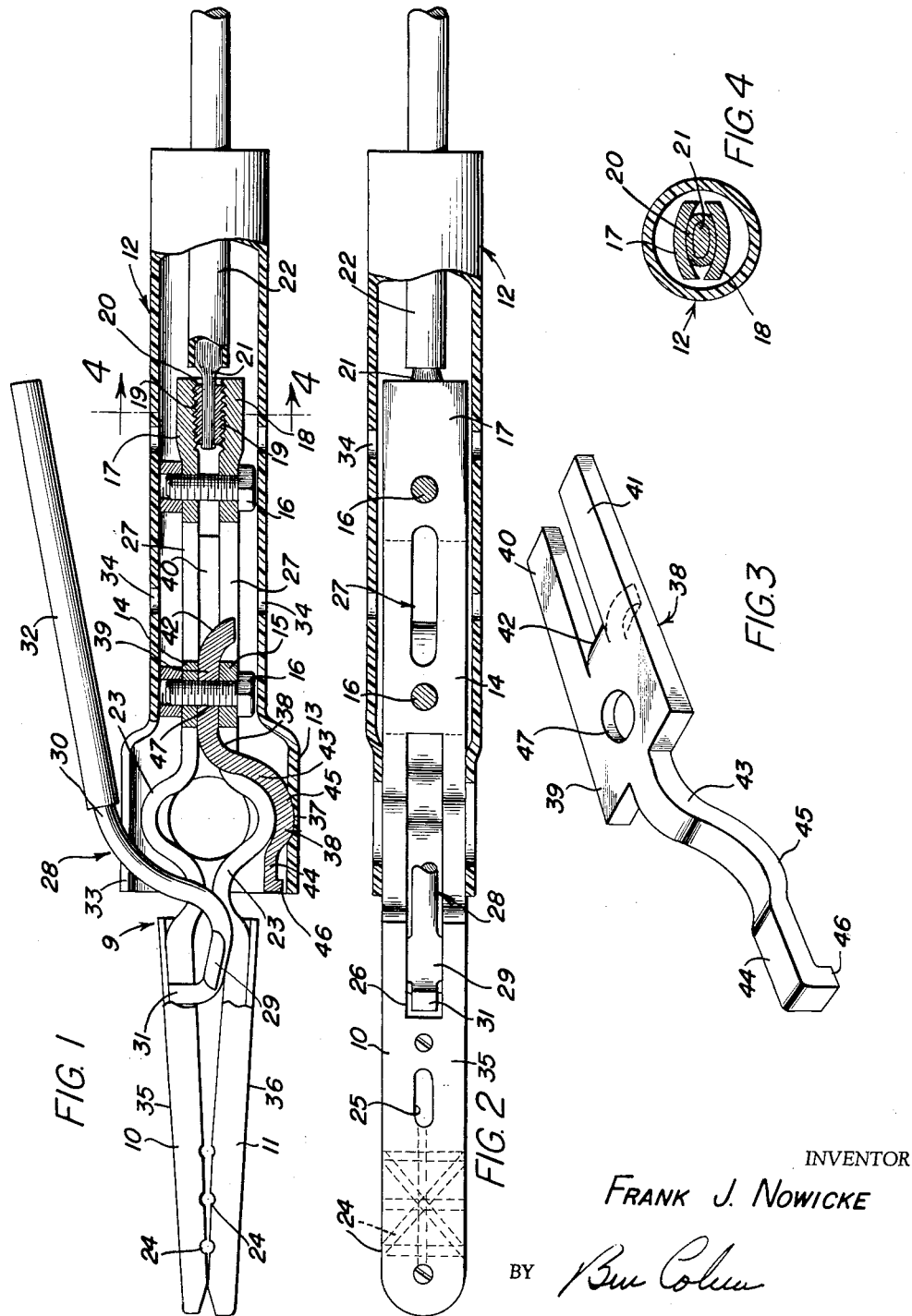
INVENTOR
FRANK J. NOWICKE
BY
ATTORNEY

United States Patent Office 2,977,459
Patented Mar. 28, 1961

2,977,459

ELECTRODE HOLDER

Frank J. Nowicke, 1300 Old Annapolis Road,
Glen Burnie, Md.

Filed Jan. 14, 1959, Ser. No. 786,844

2 Claims. (Cl. 219—141)

This invention relates to an electrode holder for use in arc welding or the like, and constitutes an improvement of my prior Patent No. 2,416,841, granted March 4, 1947.

The present invention has for its specific object an improved manner of mounting the insulated handle member shown in my prior patent mentioned above. It is customary to mount the insulating handle in a manner to make it easily removable and the usual means used for the purpose is a screw passing through the handle and anchored to the frame within the handle. One of the objections to this manner of securing the handle resides in the fact that heat is transmitted through the screw to the outside of the handle with possible injury to the user. Thus, a primary object of the present invention is to provide a novel means for assembling an insulated handle member of electrode holders wherein the handle is completely insulated.

A further object of the invention is to provide a novel arrangement for connecting the electrode to a wire conduit.

Further objects and advantages of the present invention will be apparent from the following detailed description taken in connection with the accompanying drawing wherein:

Figure 1 is a longitudinal vertical section through the holder illustrating the details of construction.

Figure 2 is a top plan view of the holder with the handle shown in section.

Figure 3 is an enlarged perspective view of the handle attaching member.

Figure 4 is a sectional view taken on line 4—4 of Figure 1.

Referring to the drawing in detail, the electrode holder 9 comprises a pair of jaw members 10, 11 and a removable insulating handle 12 having its forward end 12 belled as shown. Located within the handle 12 are the rear ends 14, 15 of jaws 10, 11 which ends are clamped together by threaded bolts 16. The extreme rear ends of the arms 10 and 11 are slightly bowed as indicated by numerals 17, 18 and are provided with transverse serrations 19 for biting into the copper band 20 formed around the wire strands 21 of conduit 22. As seen in Figure 4, the copper band is flattened to elliptical form by the clamping action of the bowed portions 17 and 18, thereby providing a positive anchor between the conduit and the electrode.

The jaws 10 and 11 are identical and a description of one will suffice for both. Jaw member 10 comprises a flat elongated bar having a resilient bowed portion 23 formed substantially midway thereof. The provision of the spring bow 23 increases the resiliency of the jaw member and also increases the length of metal between the forward end of the jaw and the handle portion, thereby tending to reduce the transfer of heat from the electrode end to the handle end.

The forward end of the jaw is provided with suitable gripping recesses 24 extending at desirable angles for proper gripping of the electrode rod. Each of the jaw members is further provided with a series of slots 25, 26 and 27 for reducing the weight of the holder and for other reasons which will appear below.

The jaw spreading mechanism comprises a lever 28 having a cam portion 29, a handle portion 30 and an upturned toe portion 31. The jaw spreading mechanism extends through the slot 26 so as to locate the cam 29 between the jaws 10 and 11 with the toe portion 31 extending upwardly through the slot 26 to keep the jaw spreading mechanism from rotating. The handle portion 30 is provided with a removable insulated handle 32 extending rearwardly over the handle 12 of the tool 9, where it may be conveniently manipulated by the operator. It will be apparent that downward movement of the handle 32 from the position shown in Figure 1 will rotate the cam 29 between the jaws 10 and 11 and thus cause separation of the jaws against the closing action of the bowed portion 23, thereby permitting removal or insertion of the electrode rod.

It will be noted that the belled end 13 of the handle 12 is provided with a slot 33 to provide a path for the movement of lever 28. The handle is further provided with a plurality of ventilation openings 34. The jaws 10 and 11 are each provided with insulating sheaths 35, 36 for electrically insulating the tool. The lower inner surface of the belled portion 13 of the insulating handle has a depression 37 formed therein for a purpose to be described.

The handle securing means, generally indicated by numeral 38, comprises a flat plate portion 39, formed with rearwardly extending leg portions 40, 41 and a downwardly bent toe portion 42. A downwardly curved tongue 43 extends from the front of the plate and terminates in a flattened portion 44 to define a rounded shoulder 45. The flattened portion 44 terminates in a downwardly extending lip 46. The flat plate portion is provided with an opening 47.

As seen in Figure 1, the flat plate portion fits between the jaw portions 14 and 15 with the forward bolt 16 passing through the opening 47. The toe portion extends into the slot 27 of the lower jaw portion and prevents rotation of the plate which also functions as a spacer between the jaws. The tongue member extends into the slot 26 of the lower jaw with shoulder 45 lying slightly below the jaw. The insulated handle is held in assembled position by shoulder 45 fitting within the depression 37. The length of the tongue 43 is such that the end thereof terminates at the forward end of the handle and the shape of the forward end is such as to provide a slight space between the lip 46 and the inner surface of the handle.

In assembling the handle and electrode, the handle is loosely supported on the conduit 22 rearwardly of the electrode while the wire is clamped to the tool. The handle is then moved forwardly until the front edge thereof strikes the shoulder 45. Further movement of the handle causes tongue 43 to give slightly until shoulder 45 is received in depression 37 to lock the handle in position. To remove the handle 12, a screw driver or similar tool can be inserted between the lip 46 and the inner surface of the handle and by slightly prying the two apart, the shoulder is lifted out of the depression 37 enabling the handle to be slid rearwardly.

Thus it will be seen that I have described a construction well adapted to produce the various objects and advantages pointed out above. While I have shown a preferred embodiment of the invention, it will be understood that the invention is not to be limited to the form shown but may be modified within the scope of the appended claims.

Having thus described the invention, what I claim is:

1. An electrode holder comprising a pair of substantially identical jaw members having electrode receiving jaw ends and cable receiving securing ends, an insulating handle surrounding said cable receiving securing ends, a depression formed in the inner surface of said handle, a cam member located between said jaw members for separating said jaw members and having an operating portion overlying said insulating handle, a plate positioned within said handle and secured between said jaw members, said plate having a toe portion cooperating with one of the jaw members for preventing rotation of said plate and having a tongue portion cooperating with said handle depression for removably locking the handle in operating position.

2. An electrode holder comprising a pair of substantially identical jaw members having electrode receiving jaw ends and cable receiving securing ends, an insulating handle surrounding said cable receiving securing ends, a depression formed in the inner surface of said handle, a cam member located between said jaw members for separating said jaw members and having an operating portion overlying said insulating handle, a plate positioned within said handle and secured between said jaw members, said plate having a toe portion cooperating with one of the jaw members for preventing rotation of said plate, said plate having a tongue portion cooperating with said handle depression for removably locking the handle in operating position, and a lip on said tongue spaced from said handle for separating said tongue from said handle to permit removal of said handle.

References Cited in the file of this patent
UNITED STATES PATENTS

| | | |
|---|---|---|
| 2,416,841 | Nowicke | Mar. 4, 1947 |
| 2,418,681 | Wells | Apr. 8, 1947 |

FOREIGN PATENTS

| | | |
|---|---|---|
| 636,259 | Great Britain | Apr. 26, 1950 |